(12) United States Patent
Zhu et al.

(10) Patent No.: US 9,062,201 B2
(45) Date of Patent: Jun. 23, 2015

(54) FLAME RETARDANT POLYLACTIC ACID COMPOUNDS

(75) Inventors: Shixiong Zhu, Avon, OH (US); Roger W. Avakian, Solon, OH (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 14/111,232

(22) PCT Filed: Apr. 12, 2012

(86) PCT No.: PCT/US2012/033296
§ 371 (c)(1),
(2), (4) Date: Dec. 4, 2013

(87) PCT Pub. No.: WO2012/142266
PCT Pub. Date: Oct. 18, 2012

(65) Prior Publication Data
US 2014/0080975 A1  Mar. 20, 2014

Related U.S. Application Data

(60) Provisional application No. 61/475,785, filed on Apr. 15, 2011.

(51) Int. Cl.
| | |
|---|---|
| C08L 67/04 | (2006.01) |
| C08L 85/02 | (2006.01) |
| C09K 21/14 | (2006.01) |
| C08J 5/00 | (2006.01) |

(52) U.S. Cl.
CPC ........ *C08L 67/04* (2013.01); *C09K 21/14* (2013.01)

(58) Field of Classification Search
USPC .......... 524/505, 537; 525/63, 92 A, 188, 190, 525/450, 902
See application file for complete search history.

(56) References Cited

U.S. PATENT DOCUMENTS

| | | | |
|---|---|---|---|
| 5,300,576 | A | 4/1994 | Nemphos et al. |
| 5,321,064 | A | 6/1994 | Vaidya et al. |
| 5,446,078 | A | 8/1995 | Vaidya et al. |
| 5,847,011 | A | 12/1998 | Ajioka et al. |
| 5,952,450 | A | 9/1999 | Ishihara et al. |
| 6,022,550 | A | 2/2000 | Watanabe |
| 6,583,232 | B1 | 6/2003 | Brown |
| 6,869,985 | B2 | 3/2005 | Mohanty et al. |
| 6,984,694 | B2 | 1/2006 | Blasius et al. |
| 7,160,937 | B2 | 1/2007 | Shibuya et al. |
| 7,256,223 | B2 | 8/2007 | Mohanty et al. |
| 7,354,656 | B2 | 4/2008 | Mohanty et al. |
| 7,504,452 | B2 | 3/2009 | Hayata et al. |
| 7,511,091 | B2 | 3/2009 | Itagaki et al. |
| 7,553,900 | B2 | 6/2009 | Hayata et al. |
| 7,645,850 | B2 | 1/2010 | Freitag et al. |
| 7,645,852 | B2 | 1/2010 | Terado et al. |
| 7,671,169 | B2 | 3/2010 | Mullen et al. |
| 7,767,744 | B2 | 8/2010 | Yao et al. |
| 7,863,382 | B2 | 1/2011 | Ishii et al. |
| 8,097,273 | B2 | 1/2012 | Fukuhira et al. |
| 8,133,943 | B2 | 3/2012 | Cho et al. |
| 8,410,214 | B2 | 4/2013 | Hayata et al. |
| 2005/0032961 | A1 | 2/2005 | Oguni et al. |
| 2005/0123744 | A1 | 6/2005 | Mohanty et al. |
| 2005/0136259 | A1 | 6/2005 | Mohanty et al. |
| 2006/0189911 | A1 | 8/2006 | Fukuhira et al. |
| 2007/0197740 | A1 | 8/2007 | Hayata et al. |
| 2007/0299227 | A1 | 12/2007 | Gopferich et al. |
| 2007/0299238 | A1 | 12/2007 | Gopferich et al. |
| 2007/0299240 | A1 | 12/2007 | Gopferich et al. |
| 2008/0015331 | A1 | 1/2008 | Terado et al. |
| 2008/0033097 | A1 | 2/2008 | Hayata et al. |
| 2008/0051508 | A1 | 2/2008 | Hayata et al. |
| 2008/0108737 | A1 | 5/2008 | Itagaki et al. |
| 2008/0237910 | A1 | 10/2008 | Yao et al. |
| 2008/0262151 | A1 | 10/2008 | Ishii et al. |
| 2008/0300379 | A1 | 12/2008 | Mullen et al. |
| 2009/0043013 | A1 | 2/2009 | Stahl et al. |
| 2009/0306287 | A1 | 12/2009 | Chung et al. |
| 2010/0160499 | A1 | 6/2010 | Cho et al. |
| 2010/0239800 | A1* | 9/2010 | Ikeda et al. .................. 428/35.7 |
| 2010/0317801 | A1* | 12/2010 | Hirasawa ...................... 525/190 |
| 2011/0071247 | A1 | 3/2011 | Ishii et al. |
| 2012/0238676 | A1* | 9/2012 | Smit et al. ....................... 524/98 |

FOREIGN PATENT DOCUMENTS

| | | |
|---|---|---|
| JP | 2010-144084 | 7/2010 |
| JP | 2011-057803 | 3/2011 |

\* cited by examiner

*Primary Examiner* — Fred M Teskin
(74) *Attorney, Agent, or Firm* — John H. Hornickel; Maria M. Hoke

(57) ABSTRACT

A significant disadvantage of the use of polylactic acid (PLA), lack of flame retardance, has been overcome by the use of polyphosphonate-co-carbonate in combination with an impact modifier, a drip suppressant, and optionally, an epoxy functional styrene-acrylate oligomeric chain extender. The compound achieves a UL 94 rating of V-0 or V-1 and a Notched Izod value of more than about 5 ft-lbs/in. The compound also exceeds a threshold of 100° C. in heat deflection temperature.

14 Claims, No Drawings

FLAME RETARDANT POLYLACTIC ACID COMPOUNDS

CLAIM OF PRIORITY

This application claims priority from U.S. Provisional Patent Application Ser. No. 61/475,785 and filed on Apr. 15, 2011, which is incorporated by reference.

FIELD OF THE INVENTION

This invention relates to new compounds including polylactic acid and having increased heat resistance and flame retardance to improve structural integrity during use of the compound containing polylactic acid.

BACKGROUND OF THE INVENTION

Plastic articles have replaced glass, metal, and wood articles because plastic can be engineered to not shatter, rust, or rot. The durability of plastic articles also creates a disposal dilemma. Also, many plastic resins are made from petrochemicals, which have long-term supply and cost issues.

Therefore, there is a considerable effort underway to find biologically-derived and sustainable sources of thermoplastic resins, preferably those which degrade or compost to also resolve the disposal dilemma.

Polylactic acid, also known as polylactide or PLA, has been explored as a thermoplastic resin from biologically sustainable origins which can replace petrochemically originated resins.

SUMMARY OF THE INVENTION

While polylactic acid is probably one of the three most popular bio-derived resins being explored, it has the distinct disadvantage, as when compared to the fossil-derived resins it is meant to replace, in that it has a poor heat deflection temperature.

Heat deflection temperature (HDT) is a measurement of deflection of a sample under flexural load using the protocol of ASTM D648. The flexural load can be either of two settings. For purposes of this invention, 66 pounds per square inch (psi) or 455 kilo-Pascals (kPa) will be used for comparative measurements of heat deflection.

The problem with polylactic acid is that it has a heat deflection temperature under a 455 kPa flexural load of about 55° C. or 131° F. In other words, inside a automobile on an Arizona summer day, PLA would not be sturdy enough to be used as a thermoplastic resin molded into a passenger compartment component, as the case for an electronic handheld device laying on the seat, or as a piece of packaging containing perishable food in a grocery bag on the floor inside the automobile.

The problem with PLA is that it does not have sufficient heat resistance to allow it to be considered as a practical replacement for fossil-derived thermoplastic resins now used in many common plastic articles.

Another problem with PLA is that it is not suitably flame retardant. As with many other thermoplastic resins, other chemicals are needed to be included in the thermoplastic compound in order for that compound to be flame retardant, especially to achieve a V-1 or V-0 rating when tested using the Underwriters' Laboratories (UL) 94 test.

Within the category of flame retardants, for regulatory reasons, there is a desire for the flame retardants to have essentially no halogen content. Within recent years, non-halogenated flame retardants have become more available.

Another problem with PLA is that it is not suitably tough, i.e., resistant to impact. Brittle thermoplastic compounds, even if heat resistant and flame retardant, are not suitable for commercial uses.

What the art needs is a heat resistant, flame retardant, impact resistant polylactic acid compound, in order that such compound can replace heat resistant, flame retardant, impact retardant thermoplastic compounds in which the thermoplastic resin is made from petrochemical sources obtained via mining or drilling into the earth.

The present invention solves that problem by compounding PLA with a particular type of flame retardants and an impact modifier and a drip suppressant, in order that the PLA compound has sufficient heat resistance, flame retardance, and impact toughness to permit the PLA compound to replace a conventional thermoplastic compound.

Optionally, the PLA compound can also include an oligomeric chain extender which is believed to react with the PLA resin to provide additional impact toughness.

The art has had a long-felt need for solving the heat resistance problem. Published literature of NatureWorks, LLC, a principal manufacturer of PLA, reports at www.natureworksllc.com that adding as much as 50% by weight of acrylonitrile-butadiene-styrene (ABS) to PLA to create a 50-50 PLA-ABS blend improves HDT by as little as 2° C. over the HDT of pure PLA polymer resin. Adding as much as 80% by weight of ABS to PLA does result in an improvement in HDT by 30° C., but at that mixture, it is actually more of an ABS polymer being modified by PLA.

Moreover, the art has had a long-felt need for solving the heat resistance problem, and it has been commonly characterized in some industries that a PLA compound should preferably have at least a 65° C. HDT at 66 psi to be a practical thermoplastic compound of both biologically sustainable origin and practical commercial use. At long last, the present invention has discovered also suitable combinations of reactants to achieve, and exceed, that goal of 65° C. at 66 psi.

The art needs a means to increase the actual HDT values for PLA, while also retaining the resulting compound as principally significantly a PLA compound.

For purposes of this invention, the PLA should be the "significant component", meaning that PLA is present in at least about thirty weight percent (30%) of the compound.

Non-halogen flame retardant additives for thermoplastic compounds can be selected from the categories of a variety of phosphorus-containing chemicals. Non-limiting examples of phosphorus-containing chemicals include polyphosphonates, metal phosphinates, melamine (poly)phosphates, polyphosphazenes. Among them, it has been found that a copolymer of polyphosphonate and polycarbonate not only provides suitable flame retardance when the other categories of phosphorus-containing chemicals failed, but also that such copolymer, also called polyphosphonate-co-carbonate, provided a boost to the heat resistance of the PLA compound.

It has been found, unexpectedly, that the combination of PLA, polyphosphonate-co-carbonate, impact modifier, and a drip suppressant can increase the HDT of a PLA compound to more than 100° C. with a V-0 UL94 rating @3.2 mm thickness and a Notched Izod of at least about 5 ft-lbs./in.

One aspect of the present invention is a heat resistant, flame retardant polylactic acid compound, comprising: (a) polylactic acid; (b) polyphosphonate-co-carbonate; (c) impact modifier in an amount of from about 5 to about 12 weight percent of the compound; (d) drip suppressant in an amount of from about 0.1 to about 2 weight percent of the compound; and optionally (e) an oligomeric chain extender.

Another aspect of the present invention is a plastic article formed from the compound described immediately above.

Features and advantages of the compound of the present invention will be further explained with reference to the embodiments and the examples showing the unexpected results.

EMBODIMENTS OF THE INVENTION

PLA

PLA is a well-known biopolymer, having the following monomeric repeating group in Formula I:

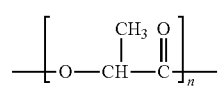

I

The PLA can be either poly-D-lactide, poly-L-lactide, or a combination of both. PLA is commercially available from NatureWorks, LLC located in all manufacturing regions of the world. Any grade of PLA is a candidate for use in the present invention. Currently, grades 4042D and 4032D are preferred. The number average molecular weight of PLA can be any which is currently available in a commercial grade or one which is brought to market in the future. To the extent that a current end use of a plastic article could benefit from being made from PLA and from having the heat resistance of the compound of the present invention, then that suitable PLA should be the starting point for constructing the compound of the present invention.

Polyphosphonate-co-carbonate

Polyphosphonate-co-carbonate is a copolymer described in U.S. Pat. No. 7,645,850 (Freitag), which disclosure is incorporated by reference herein.

As explained in U.S. Pat. No. 7,645,850, polyphosphonate-co-carbonate is formed from at least one phosphonate oligomer or polyphosphonate block covalently linked to polycarbonate, wherein the covalent linkages are between the at least one phosphonate oligomer or polyphosphonate and the polycarbonate to provide a copolymer having a single glass transition temperature (Tg). Though Freitag discloses block copolymers, random copolymers can also be formed.

Formula II identifies the structure of the phosphonate oligomer or polyphosphonate block.

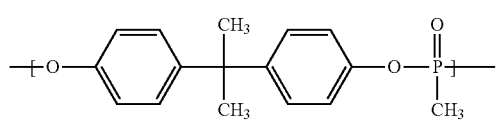

II

The polyphosphonate-co-carbonate can have a weight average molecular weight (according PC standards) ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%.

For a preferred polyphosphonate-co-carbonate, the weight average molecular weight is about 31,000; the glass transition temperature is about 124° C.; a percentage phosphorus content is about 5 weight percent of the polyphosphonate-co-carbonate; and the Limiting Oxygen Index is believed to be about 44%. For purposes of the examples below, this preferred polyphosphonate-co-carbonate will be denominated "FRX CO 45".

Two grades of polyphosphonate-co-carbonate have been publicized by FRX Polymers, Inc. of Chelmsford, Mass., USA: FRX CO 35 and FRX CO 60. The website of FRX Polymers identifies a product data sheet for the FRX CO 35 grade. Both of these grades are suitable for use in this invention, because they provide a non-halogen flame retardance and contribute to the improvement in heat resistance. Any grade between them is also acceptable for use, such as FRX CO 45 if available commercially. Alternatively, the polyphosphonate-co-carbonate can be a blend of two different polyphosphonate-co-carbonates.

U.S. Pat. No. 7,645,850 has identified that polyphosphonate-co-carbonate contributes to impact strength. As the examples identify below, the present invention has been found to require a separate ingredient to provide sufficient impact toughness for use in commercially suitable durable PLA compounds.

Impact Modifier

Any conventional impact modifier is a candidate for use in compounds of the present invention. Core/shell impact modifiers, rubbery impact modifiers, etc. are suitable.

Of the various impact modifier candidates, it has been found that a siloxane grafted impact modifier is preferred, namely, Kane Ace MR-01 grade Siloxane Flame Retardant from Kaneka Corporation, because this particular grade not only provides impact resistance for polycarbonate-based compounds but also contributes flame retardance to the compound. From Kaneka Corporation, it is known that the MR-01 copolymer flame retardant has a core of siloxane and a shell of acrylic esters. Because the polyphosphonate-co-carbonate is a polycarbonate copolymer, this MR-01 core/shell siloxane/(meth)acrylate copolymer impact modifier is especially suitable for providing both impact toughness and additional flame retardance to the compound.

Drip Suppressant

Any conventional drip suppressant is a candidate for use in the present invention because drip suppressants assist in the compound retain integrity during burning.

As identified in the published literature from Kaneka Corporation, a polycarbonate-containing compound using a siloxane/(meth)acrylate core/shell impact modifier can benefit from the addition of a drip suppressant, such as polytetrafluoroethylene (PTFE). Compounds of the present invention preferably include minor amounts of PTFE.

An additional benefit of the use of PTFE is that it is a known lubricant to assist in processing of the compound during melt-mixing or during final shaping of the plastic article.

Optional Oligomeric Chain Extender

Optionally, one can increase physical performance of the compounds of the present invention by also including an oligomeric chain extender as an ingredient.

The oligomeric chain extender useful for forming a preferred compound is an epoxy functional low molecular weight styrene-acrylate copolymer such as those disclosed in U.S. Pat. No. 6,605,681 (Villalobos et al.) and U.S. Pat. No. 6,984,694 (Blasius et al.), incorporated by reference herein.

Stated another way, the oligomeric chain extender is the polymerization product of (i) at least one epoxy-functional (meth)acrylic monomer; and (ii) at least one styrenic and/or (meth)acrylic monomer, wherein the polymerization product has an epoxy equivalent weight of from about 180 to about 2800, a number-average epoxy functionality (Efn) value of less than about 30, a weight-average epoxy functionality (Efw) value of up to about 140, and a number-average molecular weight (Mn) value of less than 6000. Preferably, the oligomeric chain extender a polydispersity index of from about 1.5 to about 5.

Of possible candidates of epoxy-functional styrene-acrylate chain extenders, Joncryl® brand chain extender oligomers are preferred, commercially available from BASF (formerly Johnson Polymers) of Milwaukee, Wis. Various grades available and useful are ADR-4300, ADR-4370, and ADR-4368, which are all solids. Alternatively, one can use liquid grades, namely: ADR-4380, ADR-4385, and ADR-4318.

Other Optional Additives

The compounds of the present invention can include other conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.williamandrew.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fire and flame retardants and smoke suppressants; initiators; lubricants; pigments, colorants and dyes; plasticizers; processing aids; release agents; slip and anti-blocking agents; stabilizers; stearates; ultraviolet light absorbers; viscosity regulators; waxes; and combinations of them.

Table 1 shows acceptable, desirable, and preferable ranges of ingredients useful in the present invention, all expressed in weight percent (wt. %) of the entire compound.

TABLE 1

|  | Acceptable | Desirable | Preferable |
|---|---|---|---|
| PLA | 30-39 | 30-38 | 30-37 |
| Polyphosphonate-co-carbonate | 50-70 | 50-65 | 50-60 |
| Siloxane/(meth)acrylate Impact Modifier | 5-12 | 5-11 | 5-10 |
| Drip Suppressant | 0.1-2.0 | 0.5-1.5 | 0.5 |
| Epoxy Functional Styrene-Acrylate Oligomeric Chain Extender | 0-2 | 0.5-2 | 0.5-1.5 |
| Other Optional Additives | 0-10 | 0-10 | 0-10 |

Processing

The preparation of compounds of the present invention is uncomplicated and can be made in batch or continuous operations.

Mixing in a continuous process typically occurs in an extruder that is elevated to a temperature that is sufficient to melt the polymer matrix with addition either at the head of the extruder or downstream in the extruder of the solid ingredient additives. Extruder speeds can range from about 50 to about 700 revolutions per minute (rpm), and preferably from about 100 to about 300 rpm. Typically, the output from the extruder is pelletized for later shaping by extrusion or molding into polymeric articles.

Mixing in a batch process typically occurs in a mixer that is also elevated to a temperature that is sufficient to melt the polymer matrix to permit addition of the solid ingredient additives. The mixing speeds range from 60 to 1000 rpm. Also, the output from the mixer is chopped into smaller sizes for later shaping by extrusion or molding into polymeric articles.

During continuous or batch processing, if present, the oligomeric chain extender reacts with the PLA or the polyphosphonate-co-carbonate or both to form the compound of the present invention.

Optionally but preferably, prior to batch or continuous melt-mixing, one can dry the ingredients to help reduce the possibility of a moisture-activated degradation or reaction in the melt-mixing vessel. Alternatively, one can use other ways to reduce degradation possibilities, such as incorporating a moisture scavenger or desiccant into the formulation, applying a vacuum within the melt-mixing vessel, etc. Any of these techniques, or combination of techniques, results in the ingredients being dried before or during melt-mixing.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.williamandrew.com), one can make articles of any conceivable shape and appearance using compounds of the present invention.

Regardless of drying or other techniques during melt-mixing, it has been found that drying the compound before molding can have a direct effect on performance properties, including heat deflection temperature. As the Examples below demonstrate, the amount of drying should be much closer to about 48 hours than about 4 hours, in order to achieve an essentially dry blended compound prior to molding, i.e., having a moisture content of less than 0.1%. To reduce the possibility of drying at a temperature approaching the heat deflection temperature of 65° C., the temperature can be up to about 60° C. without vacuum. Indeed, without undue experimentation, one can identify the best combination of time, temperature, and atmospheric pressure to reduce the time of drying while maximizing the amount of drying, without approaching a temperature which would degrade or otherwise affect performance of the compound shaped as a molded or extruded product.

Usefulness of the Invention

Any plastic article is a candidate for use of the compounds of the present invention. With the heat durability of PLA now achieved, all types of plastic articles which required an elevated HDT (and preferably a HDT of at least 100° C. at 66 psi), previously made from fossil-derived polymers, can now be made from a sustainable PLA polymer compound.

Plastic articles made from compounds of the present invention can be shaped via molding or extruding for use in the transportation, appliance, electronics, building and construction, biomedical, packaging, and consumer markets.

For example, food packaging can now be made from a PLA compound of the present invention and retain sufficient heat resistance to withstand storage or transport at temperatures approaching 60° C. The plastic article made from a compound of the present invention will retain its structural integrity at least 5° C. higher than with PLA alone and preferably at temperatures below 65° C.

Examples prove the unexpected nature of the present invention.

EXAMPLES

Comparative Examples A-BQ and Examples 1-11

These examples demonstrate the many failures of other types of non-halogenated, phosphorus-containing flame retardants and other non-halogenated flame retardants to arrive at the identification of polyphosphonate-co-carbonate as the suitable flame retardant for the present invention.

Moreover, the use of polyphosphonate-co-carbonate differs from the other candidate non-halogenated, phosphorus-containing flame retardants because the polyphosphonate-co-carbonate is present in the compound in amounts conventionally reserved for polymeric resins, not functional additives. Therefore, the use of polyphosphonate-co-carbonate unexpectedly functions as both a thermoplastic resin providing increased HDT from its polycarbonate content but also flame retardance from its polyphosphonate content.

Table 2 shows the list of ingredients. Table 3 shows one set of extrusion conditions. Table 4 shows the other set of extrusion conditions. Table 5 shows the molding conditions. Tables 6-13 show the recipes and the UL 94 flame retardance, Notched Izod impact according to ASTM D-256, and HDT at 66 psi according to ASTM D648.

A "no rating" for the UL 94 flame retardance is a failure.

TABLE 2

| Product | Purpose | Chemistry | Company Source |
|---|---|---|---|
| PLA 4042D (dry) | Bio content | Polylactic acid | Natureworks LLC |
| PLA 4032D (dry) | Bio content | Polylactic acid | Natureworks LLC |
| PC Makrolon 1239 (dry) | To blend with PLA to improve properties | Branched PC (low flow) | Bayer |
| PCMakrolon 2458 (dry) | To blend with PLA to improve properties | Branched PC (medium flow) | Bayer |
| SIDISTAR T 120 | Fused silica to minimize dripping | Spherically shaped amorphous silicon dioxide | Elkem Materials |
| FRX 100 (dry) | Flame Retardant | Polyphosphonate | FRX Polymers |
| FRX CO 35 (dry) | Flame Retardant | Copolymer of polycarbonate and polyphosphonate | FRX Polymers |
| FRX CO45 (dry) | Flame Retardant | Copolymer of polycarbonate and polyphosphonate | FRX Polymers |
| PolyPhosphazene (SPB 100) | Flame Retardant | Polyphosphazene | Otsuka |
| Stabaxol P100 | Chain Extender | Polycarbodiimide | Rhein Chemie |
| Amfine FP2200 | Flame Retardant | Ammonium polyphosphate | Adeka |
| KM 334 | Impact modifier | Core shell impact modifer (PMMA shell, acrylate rubber in core) | Dow (previously Rohm and Haas) |
| Clariant Exolit 1312 | Flame Retardant/Synergist | Aluminum Phosphinate + Nitrogen synergist | Clariant |
| Clariant Exolit 1240 | Flame Retardant/Synergist | Aluminum Phosphinate + Nitrogen synergist | Clariant |
| Melapur 200 (Melamine PolyPhosphate) | Flame Retardant/Synergist | Melamine PolyPhosphate | BASF |
| Melamine Cyanurate | Flame Retardant/Synergist | Melamine Cyanurate | Hangzhou JLS Flame Retardants Chemical Co., Ltd. |
| Kane Ace ® MR-01 | Impact Modifier | Siloxane grafted (meth)acrylate copolymer | Kaneka |
| PTFE | Drip Suppressant | PTFE | DuPont |
| DHT-4A | Acid Scavenger | Hydrotalcite | Kyowa Chemical Industry Co., Ltd. |
| Joncryl 4300 | Chain Extender | Epoxy-functional Styrene Acrylic copolymers | BASF |

TABLE 2-continued

| Product | Purpose | Chemistry | Company Source |
|---|---|---|---|
| Amfine FP2100 | Flame Retardant | Ammonium Polyphosphate | Adeka |
| Expandable Graphite 1 1722HT grade | Flame Retardant | Graphite | Asbury |
| Expandable Graphite 2 3538 grade | Flame Retardant | Graphite | Asbury |
| Cyasorb UV-5411 (UV stabilizer) | UV stabilizer | Benzotriazole | Cytec |
| CC10097724WE (PLA black concentrate) (dry) | PLA base black concentrate/Masterbatch | PLA + Carbon Black + other processing aides | PolyOne |

TABLE 3

Extruder Conditions
All Comparative Examples and Examples, Except Example 8

| | |
|---|---|
| Pre-Extruder Drying | PLA resin was dried at 80° C. for 8 hours prior to extrusion |
| Extruder Type | Prism 16 mm Counter-Rotating Twin Screw Extruder |
| Order of Addition | All ingredients mixed together and fed into the extruder hopper. |
| All Zones and Die (° C.) | 230 |
| RPM | 300 |

TABLE 4

Extruder Conditions
Example 8
(Unless Differentiated, Conditions were Same)

| | | | |
|---|---|---|---|
| Pre-Extruder Drying | PLA resin was dried to 0.2% moisture, and FRX CO45 was dried 0.2% moisture prior to extrusion | | |
| Extruder Type | Coperion 25 mm Counter-Rotating Twin Screw Extruder | | |
| Hopper Feed | Ingredient | Screw | Set Pt % |
| Conditions | PLA + FRX CO 45 + Joncryl 4300 + CC10097724WE | Pellet screw | 90.5% (27.15) |
| | Kane Ace MR-01 + PTFE + Cyasorb | Powder screw | 9.5% (2.85) |

Process Parameters

| Run Rate (kg/hr): | | 13.6 |
|---|---|---|
| Conditions | Set | Actual |
| Zone 2 Temp (° C.): | 210 | 210 |
| Zone 3 Temp (° C.): | 210 | 212 |
| Zone 4 Temp (° C.): | 204 | 204 |
| Zone 5 Temp (° C.): | 199 | 199 |
| Zone 6 Temp (° C.): | 199 | 191 |
| Zone 7 Temp (° C.): | 199 | 200 |
| Zone 8 Temp (° C.): | 199 | 197 |
| Zone 9 Temp (° C.): | 199 | 199 |
| Die Temp (° C.): | 199 | 199 |
| Screw Speed (RPM) | | 160 |
| Vacuum (mm of Hg) | | |
| Melt Temp (Hand Probe) (° C.): | | 236 |
| Die Pressure (mPa) | | 3.87 |
| Torque (%) | | 80-85 |

TABLE 4-continued

Extruder Conditions
Example 8
(Unless Differentiated, Conditions were Same)

| Water Bath | 40% Submerged |
|---|---|
| Pelletizer # | 3 |
| Pelletize Blade Speed (RPM) | 915 |
| Feed Roller Speed (RPM) | 81 |
| Classifier # | N/A |

TABLE 5

Molding Conditions
All Comparative Examples and Examples, Except Example 8
88 ton Nissei molding machine Drying Conditions before Molding:

| Temperature (° C.) | 60 |
|---|---|
| Time (h) | 10-12 |

Temperatures:

| Nozzle (° C.) | 221 |
|---|---|
| Zone 1 (° C.) | 216 |
| Zone 2 (° C.) | 216 |
| Zone 3 (° C.) | 210 |
| Mold (° C.) | 65 |
| Oil Temp (° C.) | 29 |

Speeds:

| Screw RPM (%) | 65 |
|---|---|
| % Shot - Inj Vel Stg 1 | 40 |
| % Shot - Inj Vel Stg 2 | 35 |
| % Shot - Inj Vel Stg 3 | 30 |
| % Shot - Inj Vel Stg 4 | 20 |
| % Shot - Inj Vel Stg 5 | 10 |

Pressures:

| Hold Stg 1 (mPa) - | 3.5 |
|---|---|
| Time(sec) | 5 |
| Hold Stg 2 (mPa) - | 3 |
| Time(sec) | 5 |

Timers:

| Injection Hold (sec) | 8 |
|---|---|
| Cooling Time (sec) | 25 |

Operation Settings:

| Shot Size (mm) | 55 |
|---|---|
| Cushion (mm) | 1.5-1.8 |

TABLE 6

| Ingredients (Wt. %) | A | B | C | D | E | F | G | H | I | J |
|---|---|---|---|---|---|---|---|---|---|---|
| PLA 4042D (dry) | 49.2 | 49.2 | 79.5 | 79.5 | 10.0 | 15.0 | 20.0 | 25.0 | 30.0 | 30.0 |
| PC Makrolon 1239 (dry) | | | | | 74.5 | 69.5 | 64.5 | 59.5 | 54.5 | 52.5 |
| FRX CO 35 (dry) | 49.3 | 34.5 | | | | | | | | |
| PolyPhosphazene (SPB 100) | | 14.8 | | | 15.0 | 15.0 | 15.0 | 15.0 | 15.0 | 15.0 |
| Clariant Exolit 1312 | | | 20.0 | | | | | | | |
| Clariant Exolit 1240 | | | | 20.0 | | | | | | |
| PTFE | 0.5 | 0.5 | 0.5 | 0.5 | 0.5 | 0.5 | 0.5 | 0.5 | 0.5 | 0.5 |
| DHT-4A | | | | | | | | | | 2.0 |
| Joncryl 4300 | 1.0 | 1.0 | | | | | | | | |
| Total | 100.0 | 100.0 | 100.0 | 100.0 | 100.0 | 100.0 | 100.0 | 100.0 | 100.0 | 100.0 |
| Data Results | | | | | | | | | | |
| UL 94 FR testing (Burning extruded strands) | no rating | no rating | no rating | no rating | no rating | no rating | no rating | no rating | no rating | no rating |

TABLE 7

| Ingredients (Wt. %) | K | L | M | N | O | P | Q | R | S | T |
|---|---|---|---|---|---|---|---|---|---|---|
| PLA 4042D (dry) | 30.0 | 30.0 | 30.0 | 30.0 | 30.0 | 30.0 | 30.0 | 30.0 | 30.0 | 30.0 |
| PC Makrolon 1239 (dry) | 52.5 | 52.5 | 44.5 | 44.5 | 52.5 | 44.5 | 44.5 | 39.5 | 52.0 | |
| PCMakrolon 2458 (dry) | | | | | | | | | | 52.0 |
| PolyPhosphazene (SPB 100) | 15.0 | 15.0 | 13.0 | 13.0 | 15.0 | 13.0 | 13.0 | | 15.0 | 15.0 |
| Clariant Exolit 1312 | | | 10.0 | 10.0 | | 10.0 | 10.0 | | | |
| Melamine Cyanurate | 2.0 | | | 2.0 | 2.0 | | 2.0 | | 2.0 | 2.0 |
| Melamine Polyphosphate | | 2.0 | | | | | | | | |
| PTFE | 0.5 | 0.5 | 0.5 | 0.5 | 0.5 | 0.5 | 0.5 | 0.5 | 1.0 | 1.0 |
| DHT-4A | | | 2.0 | | | 2.00 | | | | |
| Amfine FP2100 | | | | | | | | 30.0 | | |
| Total | 100.0 | 100.0 | 100.0 | 100.0 | 100.0 | 100.0 | 100.0 | 100.0 | 100.0 | 100.0 |
| Data Results | | | | | | | | | | |
| UL 94 FR testing (Burning extruded strands) | V-2 | no rating | no rating | no rating | V-2 | no rating | no rating | no rating | | |
| UL 94 FR testing (Burning flame bars) | | | | | | | | | V2 (3.2 mm) | No rating (3.2 mm) |
| HDT (@66 psi load), °C. | | | N/A | N/A | N/A | N/A | | | 95 | N/A |
| Notched Izod Impact (room temperature), ft-lb/in | | | N/A | N/A | N/A | N/A | | | 1.2 | N/A |

TABLE 8

| Ingredients (Wt. %) | U | V | W | X | Y | Z | AA | AB | AC | AD |
|---|---|---|---|---|---|---|---|---|---|---|
| PLA 4042D (dry) | 30.0 | 30.0 | 30.0 | 30.0 | 30.0 | 30.0 | 30.0 | 30.0 | 30.0 | 30.0 |
| PC Makrolon 1239 (dry) | 44.0 | 44.0 | 59.0 | 54.0 | 59.0 | 54.0 | | 52.0 | 52.0 | 52.0 |
| SIDISTAR T 120 | | | | | | | | 2.0 | 2.0 | 5.0 |
| FRX 100 (dry) | | | | | 10.0 | 15.0 | | | | |
| FRX CO45 (dry) | | | | | | | 68.0 | | | |
| PolyPhosphazene (SPB 100) | 13.0 | 13.0 | | | | | | 13.0 | 13.0 | 10.0 |
| Clariant Exolit 1312 | 10.0 | 10.0 | | | | | | | | |

TABLE 8-continued

|  | U | V | W | X | Y | Z | AA | AB | AC | AD |
|---|---|---|---|---|---|---|---|---|---|---|
| Melamine Cyanurate |  | 2.0 |  |  |  |  |  | 2.0 | 2.0 | 2.0 |
| Kane Ace MR-01 |  |  | 10.0 | 15.0 |  |  |  |  |  |  |
| PTFE | 1.0 | 1.0 | 1.0 | 1.0 | 1.0 | 1.0 | 1.0 | 1.0 | 1.0 | 1.0 |
| DHT-4A | 2.00 |  |  |  |  |  |  |  |  |  |
| Joncryl 4300 |  |  |  |  |  |  | 1.00 |  | 1.00 |  |
| Total | 100.0 | 100.0 | 100.0 | 100.0 | 100.0 | 100.0 | 100.0 | 100.0 | 101.0 | 100.0 |
| Data Results |  |  |  |  |  |  |  |  |  |  |
| UL 94 FR testing (Burning flame bars) | No rating (3.2 mm) | No rating (3.2 mm) | no rating (1.6 mm) | no rating (1.6 mm) | no rating (1.6 mm) | no rating (1.6 mm) | V-0 (1.6 mm thick) | V-2 (3.2 mm) | V-2 (3.2 mm) | V-2 (3.2 mm) |
| HDT (@66 psi load), ° C. | N/A | N/A | N/A | N/A | N/A | N/A | 103 | N/A | N/A | N/A |
| Notched Izod Impact (room temperature), ft-lb/in | N/A | N/A | N/A | N/A | N/A | N/A | 0.3 | N/A | N/A | N/A |

TABLE 9

|  | AE | AF | AG | AH | AI | AJ | AK | AL | AM | AN |
|---|---|---|---|---|---|---|---|---|---|---|
| Ingredients (Wt. %) |  |  |  |  |  |  |  |  |  |  |
| PLA 4042D (dry) | 30.0 | 30.0 | 30.0 | 30.0 | 30.0 | 30.0 | 30.0 | 30.0 | 78.0 | 30.0 |
| PC Makrolon 1239 (dry) | 51.0 | 44.0 | 39.0 | 38.0 | 33.0 | 52.0 | 47.0 |  |  | 46.0 |
| SIDISTAR T 120 | 5.0 |  |  |  |  |  |  |  |  |  |
| FRX 100 (dry) |  | 25.0 | 30.0 | 30.0 | 30.0 |  |  |  |  | 10.0 |
| FRX CO45 (dry) |  |  |  |  |  |  |  | 69.0 |  |  |
| PolyPhosphazene (SPB 100) | 10.0 |  |  |  |  | 15.0 | 15.0 |  |  | 10.0 |
| Stabaxol P100 |  |  |  |  |  |  |  |  | 1.0 |  |
| Amfine FP2200 |  |  |  |  |  |  |  |  | 20.0 |  |
| KM 334 |  |  |  |  | 5.0 |  | 4.0 |  |  |  |
| Melamine Cyanurate |  | 2.0 |  |  |  | 2.0 | 2.0 |  |  | 2.0 |
| PTFE | 1.0 | 1.0 | 1.0 | 1.0 | 1.0 | 1.0 | 1.0 | 1.0 | 1.0 | 1.0 |
| Joncryl 4300 | 1.00 |  |  | 1.00 | 1.00 | 1.00 | 1.00 |  |  | 1.00 |
| Total | 100.0 | 100.0 | 100.0 | 100.0 | 100.0 | 101.0 | 100.0 | 100.0 | 100.0 | 100.0 |
| Data Results |  |  |  |  |  |  |  |  |  |  |
| UL 94 FR testing (Burning extruded strands) |  |  |  |  |  |  |  | V-0 (strands) | No rating |  |
| UL 94 FR testing (Burning flame bars) | V-2 (3.2 mm) | V-0 (1.6 mm) | V-0 (1.6 mm) | V-0 (1.6 mm) | V-2 (1.6 mm) | V-2 (1.6 mm) | No rating (1.6 mm) |  |  | V-2 (3.2 mm) |
| HDT (@66 psi load), ° C. | N/A |  |  |  |  |  |  |  |  | N/A |
| Notched Izod Impact (room temperature), ft-lb/in | N/A | Brittle | Brittle | Brittle | Brittle | Brittle | Brittle | Brittle | Brittle | N/A |

TABLE 10

|  | AO | AP | AQ | AR | AS | AT | AU | AV | AW | AX |
|---|---|---|---|---|---|---|---|---|---|---|
| Ingredients (Wt. %) |  |  |  |  |  |  |  |  |  |  |
| PLA 4042D (dry) | 30.0 | 30.0 | 30.0 | 30.0 | 30.0 | 30.0 | 30.0 | 30.0 | 30.0 | 30.0 |
| PC Makrolon 1239 (dry) | 44.0 | 39.0 | 36.0 |  |  | 39.5 | 44.0 | 44.0 | 39.0 | 48.5 |
| PC Makrolon 2458 (dry) |  |  |  | 44 | 39 |  |  |  |  |  |
| FRX 100 (dry) | 25.0 | 30.0 | 30.0 | 25.0 | 30.0 | 30.0 | 20.0 | 15.0 | 20.0 |  |
| KM 334 |  |  | 3.0 |  |  |  |  |  |  |  |
| Melapur 200 |  |  |  |  |  |  |  |  |  | 20.0 |
| Melamine Cyanurate |  |  |  |  |  |  | 5.0 | 10.0 | 10.0 |  |
| PTFE | 1.0 | 1.0 | 1.0 | 1.0 | 1.0 | 0.5 | 1.0 | 1.0 | 1.0 | 0.5 |
| Joncryl 4300 |  |  |  |  |  |  |  |  |  | 1.0 |
| Total | 100.0 | 100.0 | 100.0 | 100.0 | 100.0 | 100.0 | 100.0 | 100.0 | 100.0 | 100.0 |

TABLE 10-continued

|  | AO | AP | AQ | AR | AS | AT | AU | AV | AW | AX |
|---|---|---|---|---|---|---|---|---|---|---|
| Data Results | | | | | | | | | | |
| UL 94 FR testing (Burning extruded strands) | | | | V-0 | V-0 | V-0 | V-2 | V-2 | V-2 | no rating |
| UL 94 FR testing (Burning flame bars) | V-0 (1.6 mm) | V-0 (1.6 mm) | V-2 (1.6 mm) | | | | | | | |
| HDT (@66 psi load), °C. | 106 | 103 | 103 | N/A | N/A | N/A | N/A | N/A | N/A | N/A |
| Notched Izod Impact (room temperature), ft-lb/in | 0.3 | 0.3 | 0.3 | N/A | N/A | N/A | N/A | N/A | N/A | N/A |

TABLE 11

|  | AY | AZ | BA | BB | BC | BD | 1 | BE | 2 | 3 |
|---|---|---|---|---|---|---|---|---|---|---|
| Ingredients (Wt. %) | | | | | | | | | | |
| PLA 4042D (dry) | 30.0 | 30.0 | 30.0 | 30.0 | 30.0 | 30.0 | 30.0 | 30.0 | 30.0 | 35.0 |
| PC Makrolon 1239 (dry) | 43.5 | 38.5 | 48.5 | 43.5 | 38.5 | | | | | |
| FRX CO45 (dry) | | | | | | 68.0 | 58.0 | 53.0 | 58.0 | 53.0 |
| Melapur 200 | 25.0 | 30.0 | | | | | | | | |
| Melamine Cyanurate | | | 20.0 | 25.0 | 30.0 | | | | | |
| Kane Ace MR-01 | | | | | | | 10.0 | 15.0 | 10.0 | 10.0 |
| PTFE | 0.5 | 0.5 | 0.5 | 0.5 | 0.5 | 1.0 | 1.0 | 1.0 | 1.0 | 1.0 |
| Joncryl 4300 | 1.0 | 1.0 | 1.0 | 1.0 | 1.0 | 1.0 | 1.0 | 1.0 | 1.0 | 1.0 |
| Total | 100.0 | 100.0 | 100.0 | 100.0 | 100.0 | 100.0 | 100.0 | 100.0 | 100.0 | 100.0 |
| Data Results | | | | | | | | | | |
| UL 94 FR testing (Burning extruded strands) | no rating | no rating | no rating | no rating | no rating | | | | | |
| UL 94 FR testing (Burning flame bars) | | | | | | V-0 (3.2 mm), V-0 (1.6 mm) | V-0 (3.2 mm) | No rating (3.2 mm) | V-0 (3.2 mm), No rating (1.6 mm) | V-0 (3.2 mm), No rating (1.6 mm) |
| HDT (@66 psi load), °C. | N/A | N/A | N/A | N/A | N/A | 115 | 112 | 110 | 112 | N/A |
| Notched Izod Impact (room temperature), ft-lb/in | N/A | N/A | N/A | N/A | N/A | 0.56 | 8.6 | 13.6 | 8.6 | N/A |

TABLE 12

|  | BF | 4 | 5 | BG | BH | BI | BJ | BK | BL | BM |
|---|---|---|---|---|---|---|---|---|---|---|
| Ingredients (Wt. %) | | | | | | | | | | |
| PLA 4042D (dry) | 40.0 | 30.0 | 30.0 | 85.00 | 70.0 | 80.00 | 85.0 | 85.00 | 70.0 | 80.00 |
| FRX CO45 (dry) | 48.0 | 60.0 | 62.0 | | | | | | | |
| Kane Ace MR-01 | 10.0 | 8.0 | 6.0 | | | | | | | |
| PTFE | 1.0 | 1.0 | 1.0 | | | | | | | |
| Joncryl 4300 | 1.0 | 1.0 | 1.0 | | | | | | | |
| Amfine FP2100 | | | | 3.75 | 18.0 | 5.00 | | 3.75 | 18.0 | 5.00 |
| Expandable Graphite 1 1722HT grade | | | | 11.25 | 12.0 | 15.00 | 15.0 | | | |
| Expandable Graphite 2 3538 grade | | | | | | | | 11.25 | 12.0 | 15.00 |
| Total | 100.0 | 100.0 | 100.0 | 100.0 | 100.0 | 100.0 | 100.0 | 100.0 | 100.0 | 100.0 |
| Data Results | | | | | | | | | | |
| UL 94 FR testing (Burning flame bars) | No rating (3.2 mm), No rating (1.6 mm) | V-1 (1.6 mm) | V-1 (1.6 mm) | no rating | no rating | no rating | no rating | no rating | no rating | no rating |

TABLE 12-continued

|  | BF | 4 | 5 | BG | BH | BI | BJ | BK | BL | BM |
|---|---|---|---|---|---|---|---|---|---|---|
| HDT (@66 psi load), ° C. | N/A | N/A | N/A |  |  |  |  |  |  |  |
| Notched Izod Impact (room temperature), ft-lb/in | N/A | N/A | N/A | N/A | N/A | N/A | N/A | N/A | N/A | N/A |

TABLE 13

|  | BN | 6 | 7 | 8 | 9 | BO | BP | 10 | 11 | BQ |
|---|---|---|---|---|---|---|---|---|---|---|
| Ingredients (Wt. %) |  |  |  |  |  |  |  |  |  |  |
| PLA 4042D (dry) | 85.0 | 30.00 | 30.00 |  | 30.00 | 30.00 | 30.00 | 30.00 | 30.00 | 30.00 |
| PLA 4032D (dry) |  |  |  | 28.24 |  |  |  |  |  |  |
| PC Makrolon 1239 (dry) |  |  |  |  |  |  |  |  |  | 31.90 |
| FRX 100 (dry) |  |  |  |  |  |  |  |  |  | 26.10 |
| FRX CO45 (dry) |  | 59.50 | 57.50 | 59.26 | 56.00 | 54.00 | 53.00 | 59.50 | 59.00 |  |
| Kane Ace MR-01 |  | 10.0 | 10.0 | 8.00 | 12.00 | 14.00 | 15.00 | 10.00 | 10.00 | 10.00 |
| PTFE |  | 0.5 | 1.0 | 1.00 | 1.00 | 1.00 | 1.00 | 0.50 | 1.00 | 1.00 |
| Joncryl 4300 |  |  | 1.0 | 1.00 | 1.0 | 1.0 | 1.0 |  |  | 1.0 |
| Expandable Graphite 2 3538 grade | 15.0 |  |  |  |  |  |  |  |  |  |
| Cyasorb UV-5411 (UV stabilizer) |  |  | 0.5 | 0.50 |  |  |  |  |  |  |
| CC10097724WE (PLA black concentrate) |  |  |  | 2.00 |  |  |  |  |  |  |
| Total | 100.0 | 100.0 | 100.0 | 100.0 | 100.0 | 100.0 | 100.0 | 100.0 | 100.0 | 100.0 |
| Data Results |  |  |  |  |  |  |  |  |  |  |
| UL 94 FR testing (Burning flame bars) | no rating | V-0 (3.2 mm) | V-0 (3.2 mm) | V-0 (3.2 mm), V-1 (1.6 mm) | V-1 (3.2 mm) | V-2 (3.2 mm) | No rating (3.2 mm) | V-0 (3.2 mm) | V-0 (3.2 mm) | V-0 (3.2 mm) |
| HDT (@66 psi load), ° C. |  | 112 | 109 | 109 | 112 | 109 | 110 | 111 | 111 | 112 |
| Notched Izod Impact (room temperature), ft-lb/in | N/A | 5.2 | 9 | 6.2 | 9 | 12.4 | 13.2 | 5.1 | 4.8 | 0.4 |

Tables 6-13 identify the progression of experimentation to produce this invention. Numerous non-halogenated, phosphorus-containing flame retardants and expandable graphite were attempted to be used as functional additives in a blend of PLA and polycarbonate.

Only the polyphosphonate-co-carbonate successfully yielded flame retardant test results of UL-94 V-0 or V-1, which are acceptable for purposes of this invention.

Only the polyphosphonate-co-carbonate with the siloxane/(meth)acrylate impact modifier yielded a flame retardant result of UL-94 V-0 or V-1 and a Notched Izod impact rating of more than about 5 ft.-lbs./in.

Comparative Examples A and B demonstrate that PLA can not exceed about 49 percent of the total compound, even if polyphosphonate-co-carbonate is used as the flame retardant. Comparative Examples C and D demonstrate that aluminum phosphinate and nitrogen synergist does not work if especially the content of PLA exceeds 75 weight percent. Comparative Examples E-Q demonstrate at various PLA levels that polyphosphazene is not a suitable flame retardant, even down to 10 weight percent PLA content. The presence or absence of aluminum polyphosphinate and nitrogen synergist did not matter; all failed.

Comparative Example R demonstrates that ammonium polyphosphate fails as a suitable flame retardant even at 30 weight percent of PLA. Comparative Examples S and T demonstrate that the combination of polyphosphonate and melamine cyanurate did not work; neither did Comparative Example U which replace melamine cyanurate with aluminum phosphinate and nitrogen synergist nor did Comparative Example V which added the latter to the former.

Comparative Examples W and X demonstrate that merely using the impact modifier also having flame retardant properties was insufficient. Comparative Examples Y and Z demonstrate that using polyphosphonate homopolymer was also a failure.

Comparative Example AA demonstrates that use of the polyphosphonate-co-carbonate with a 30% content of PLA is capable of obtaining a UL 94 V-0 rating, the first hint of success after 26 prior attempts, but Notched Izod impact is very, very poor, unacceptable for commercial uses.

Comparative Examples AB-AE demonstrate that a combination of polyphosphazene, melamine cyanurate, and fused silica yielded a UL 94 V-2 rating, but that rating is insufficient for the marketplace.

Comparative Examples AF-AI demonstrate it is possible to achieve a UL 94 V-0 rating using polyphosphazene homopolymer, but the introduction of a traditional core/shell impact modifier into Comparative Example AI shows that only a UL 94 V-2 rating would result if the compound were to have sufficiently marketable Notched Izod values.

Comparative Example AJ and AK attempted to combine polyphosphazene and melamine cyanurate, without and with the traditional core/shell impact modifier, without success.

Comparative Example AL again offered hope that the use of polyphosphonate-co-carbonate with PLA would yield a fully acceptable flame retardant compound, but no impact toughness was tested. Comparative Example AM demonstrates that use of a chain extender and ammonium polyphosphate was a failure.

Comparative Examples AN-AW tested the use of polyphosphanate with and without melamine cyanurate, traditional core/shell impact modifier, and different grades of polycarbonate. Of all of them, only Comparative Examples AO and AP achieved UL 94 V-0 rating, but their impact toughness was commercially inadequate.

Comparative Examples AX-BC explored melamine polyphosphate and melamine cyanurate as flame retardants; both were dead ends.

Success at understanding the invention came with the next eight experiments. Comparative Example BD did not include siloxane/(meth)acrylate impact modifier and was not tough enough. Comparative Example BE had too much impact modifier and was not sufficiently flame retardant. Comparative Example BF had too much PLA and was not sufficiently flame retardant. However, Examples 1-5 and especially Examples 1-3 identified the narrow window of formulation in which the compounds of the present invention would have sufficient flame retardance and impact toughness.

Comparative Examples BG-BM demonstrate that using ammonium polyphosphate and expandable graphite as flame retardants would not work, nor using only expandable graphite as seen in Comparative Example BN.

Examples 6 and 7 demonstrate returning to the use of polyphosphonate-co-carbonate as the flame retardant and siloxane/(meth)acrylate core/shell impact modifier provided both acceptable flame retardance and impact toughness. Example 7 differed from Example 6 in that the epoxy functional styrene-acrylate oligomeric chain extender provided 73% better impact toughness. Thus, while optional, the use of that oligomeric chain extender is preferred.

Example 8 demonstrates use of a different grade of PLA still produced acceptable results, with the PLA content reaching 30 weight percent by virtue of the PLA content in the PLA black color concentrate.

Example 9 demonstrates that a 20% increase in the siloxane/(meth)acrylate core/shell impact modifier without the presence of the oligomeric chain extender reduces UL 94 flame retardance to V-1 while Comparative Examples BO and BP increased the content of the impact modifier beyond acceptable levels for proper flame retardance.

Examples 10 and 11 studied the effect of the amount of drip suppressant, finding that only impact toughness was affected slightly.

To affirm the finding that polyphosphonate-co-carbonate is far preferable over polyphosphonate homopolymer, Comparative Example BQ demonstrates the polyphosphonate-co-carbonate is superior over a combination of polycarbonate and polyphosphonate.

By this exhaustive experimentation, the invention of acceptable flame retardance and impact toughness has been found for a PLA compound having a minimum of 30 weight percent PLA. The range of siloxane/(meth)acrylate impact modifier and the range of PLA demonstrated a narrow window of acceptable performance. Yet, it was found and provided 11 different examples for a person having ordinary skill in the art to adjust within, depending on the precise performance requirements for a tough, flame retardant PLA compound. Those 11 examples also demonstrated a HDT (@66 psi load), ° C. of more than 100° C. in each case and in excess of 110° C. in most cases.

Depending on the phosphorus content of the polyphosphonate-co-carbonate, it may be possible to have a higher amount of polylactic acid represent in the compound of the present invention.

The invention is not limited to the above embodiments. The claims follow.

What is claimed is:

1. A heat resistant, flame retardant polylactic acid compound, comprising:
   (a) polylactic acid in an amount of from about 30 to 39 weight percent of the compound;
   (b) polyphosphonate-co-carbonate;
   (c) core/shell siloxane/(meth)acrylate copolymer impact modifier in an amount of from about 5 to about 12 weight percent of the compound;
   (d) drip suppressant in an amount of from about 0.1 to about 2 weight percent of the compound; and optionally
   (e) an oligomeric chain extender,
   wherein the compound when shaped into a plastic article has a heat deflection temperature increase of at least 5° C. more than the heat deflection temperature of a plastic article made of polylactic acid alone, when both are measured at 66 pounds per square inch using the protocol of ASTM D648.

2. The compound of claim 1, wherein the polyphosphonate-co-carbonate is in an amount of from about 50 to about 70 weight percent of the compound and is formed from at least one phosphonate oligomer or polyphosphonate block covalently linked to polycarbonate, wherein the covalent linkages are between the at least one phosphonate oligomer or polyphosphonate block and the polycarbonate to provide a copolymer having a single glass transition temperature (Tg).

3. The compound of claim 1, wherein the polyphosphonate-co-carbonate has a weight average molecular weight ranging from about 30,000 to about 50,000; a glass transition temperature ranging from about 120° C. to about 133° C.; a percentage phosphorus content of about 3.8 to about 6.5 weight percent of the polyphosphonate-co-carbonate; and a Limiting Oxygen Index ranging from about 40% to about 50%.

4. The compound of claim 3, wherein the phosphonate oligomer or polyphosphonate block has the structure of

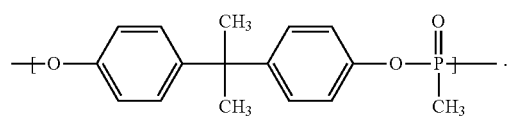

5. The compound of claim 4, wherein the polyphosphonate-co-carbonate is a blend of two different polyphosphonate-co-carbonates.

6. The compound of claim 1, wherein if the blended compound is essentially dried before shaping into a plastic article, then the blended compound after shaping into the plastic article has a heat deflection temperature of at least 100° C. at 66 pounds per square inch using the protocol of ASTM D648.

7. The compound of claim 1, wherein the polylactic acid comprises poly-D-lactide, poly-L-lactide, or a combination of both.

8. The compound of claim 1, wherein the oligomeric chain extender is an epoxy-functional styrene-acrylic oligomer, and wherein the amount of epoxy-functional styrene-acrylic oligomer is present in the compound from about 0.5 to about 2 weight percent.

9. The compound of claim 1, wherein the drip suppressant is polytetrafluoroethylene.

10. A plastic article shaped from a compound of claim 1.

11. The article of claim 10, wherein the article is molded or extruded and wherein the article is shaped for use in transportation, appliance, electronics, building and construction, packaging, or consumer markets.

12. The article of claim 10, wherein the article has a UL 94 flame retardance of V-0 or V-1 at 3.2 mm thickness.

13. A method of making the compound of claim 1, comprising the steps of
   (a) gathering ingredients including polylactic acid, polyphosphonate-co-carbonate, impact modifier, and drip suppressant and, optionally, an epoxy functional styrene-acrylate oligomeric chain extender, and
   (b) melt-mixing them into a compound for subsequent shaping into a plastic article shaped for use in transportation, appliance, electronics, building and construction, packaging, or consumer markets.

14. The method of making the compound of claim 13, further comprising the steps of
   (c) drying the compound to a moisture content of less than 0.1% and
   (d) shaping the compound into a plastic article for use in transportation, appliance, electronics, building and construction, packaging, or consumer markets.

* * * * *